July 5, 1960    J. T. GORSUCH    2,943,435
INDICATING DEVICE

Filed Sept. 7, 1956    2 Sheets-Sheet 1

INVENTOR
JOHN T. GORSUCH
BY Julian C. Renfro
ATTORNEY

July 5, 1960    J. T. GORSUCH    2,943,435
INDICATING DEVICE

Filed Sept. 7, 1956    2 Sheets-Sheet 2

INVENTOR
JOHN T. GORSUCH

BY *Julian C. Renfro*
ATTORNEY

United States Patent Office 2,943,435
Patented July 5, 1960

2,943,435

INDICATING DEVICE

John T. Gorsuch, Baltimore, Md., assignor to The Martin Company, Middle River, Md., a corporation of Maryland Filed Sept. 7, 1956, Ser. No. 608,453

3 Claims. (Cl. 58—3)

This invention relates to an indicating device such as a clock, and more particularly to such a device having a representation of the earth centrally disposed thereon, about which a smaller body is movable to represent the oribital path of an earth satellite.

According to this invention, at least one hand of the clock is equipped with a small member slidably disposed thereon, and means are provided to cause this member to move back and forth along a portion of the length of the hand so as to describe a generally elliptical path each time the hand rotates through a full revolution. At least a portion of a sphere can be centrally disposed on the device to represent the earth, and the small member travelling in the elliptical path thereabout is representative of the orbital path of a satellite about the earth.

In the new indicating device according to this invention, the member slidably disposed upon the hand may take the form of a spherical bead, such as a pearl or an artificial pearl, and a groove may be provided on the face of the clock, describing an elliptical path in which the pearl may roll or otherwise travel as the hand sweeps about the clock face. In the interest of realism, the pearl may be located upon the seconds hand of the clock, so as to possess fairly rapid motion.

An object of this invention is to provide an indicating device in the nature of a clock, that is exceptionally novel and attractive in appearance.

Another object of this invention is to provide an indicating device that is simple in construction and which will readily lend itself to economical manufacture.

A more specific object of this invention is to provide an indicating device having symbolic representation of the earth centrally located thereon and a member movable thereabout in a substantially elliptical path to represent the orbital path of an earth satellite.

The invention will be further described in connection with the accompanying drawings which illustrate a preferred embodiment of the invention. However, it is to be understood that such further disclosure is by way of exemplification and the invention is not limited thereby, but only to the extent set forth in the appended claims.

Figure 1:
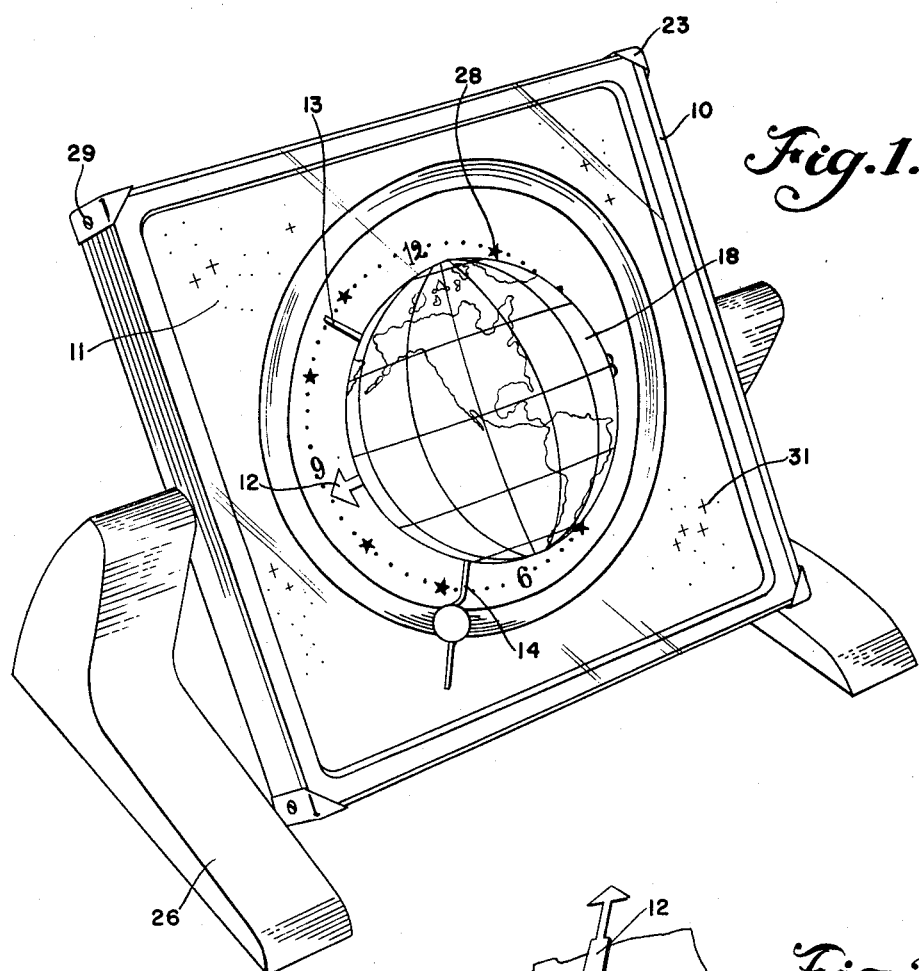
Figure 1 is a perspective view of a clock embodying this invention.
Figure 2:
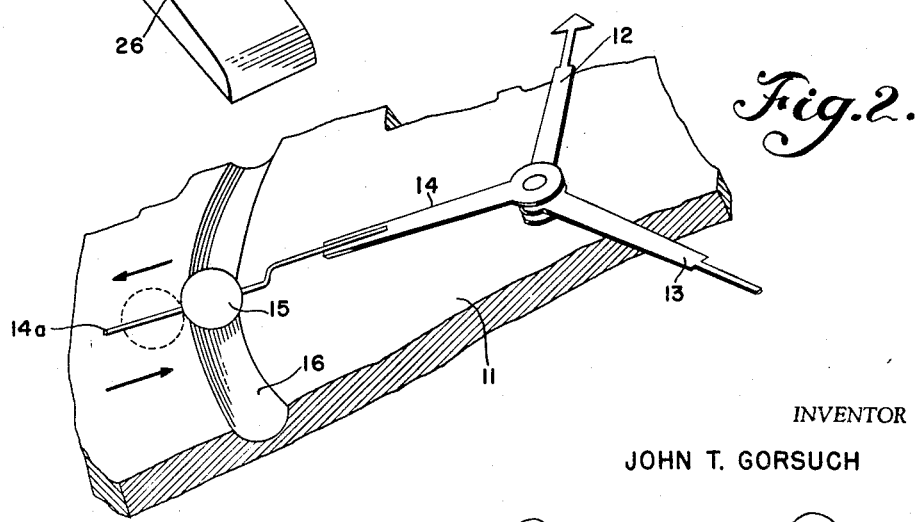
Figure 2 is an enlarged fragmentary view of a portion of the dial of a clock according to Figure 1, illustrating the relationship of the hands of the clock, and the small member movable about the clock face.

In Figure 1 is illustrated an exemplary form of clock according to this invention, comprising a dial member 10, a clock face 11, hour hand 12, minute hand 13, and seconds hand 14. Located on the outer end of seconds hand 14 of this clock is an extension member 14a (Fig. 2) which is integral with the seconds hand 14. The extension member is arranged to accommodate a generally circular body or member 15 thereon. Member 15 is preferably a spherical body in the nature of a pearl or bead that is movable back and forth on the extension member as the seconds hand sweeps about the clock face, in such a manner as to describe a generally elliptical path. Therefore, extension member 14a is preferably round in cross section, with the member 15 rotatable upon extension 14a. In this manner the member 15 presents the least drag to the clock mechanism, and also possesses a realistic rotation somewhat similar to that of a satellite.

Figure 3:
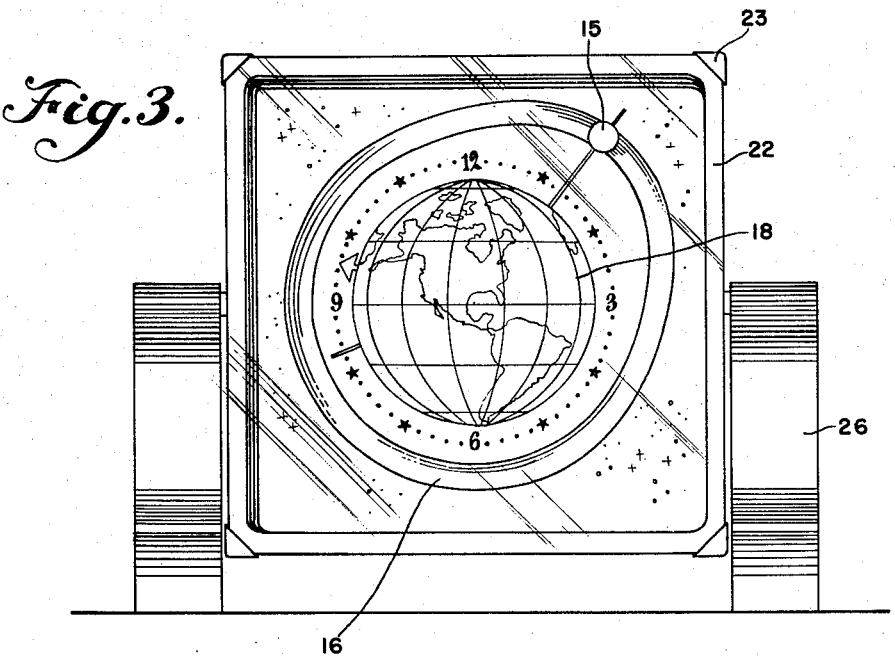
Figure 3 is a front elevation of the clock shown in Figure 1.

In order to cause the member 15 to travel in a desired path about the clock face 11, a groove 16 is advantageously provided, which groove has a cross section in which member 15 can easily travel. As can best be seen from Figures 1 and 3, groove 16 is laid out in a generally elliptical path, for it is in a path of this general nature that an earth satellite travels about the earth.

In order to lend a certain amount of additional realism to the present satellite arrangement, at least a portion of a sphere 18 representative of the earth is preferably provided, which is centrally located with respect to the axis of rotation of the hands of the clock. The relationship of diameter of the earth to the length of the clock hands is such that the viewer of the clock will experience no difficulty in ascertaining the time of day. As revealed in Figure 4, the earth 18 may be less than a hemisphere in size, and may be secured directly to the crystal 19 by means of screws 21 that extend through holes in the crystal and threadedly engage the rear portion of the earth 18. The crystal may be of glass, clear plastic or the like as may be preferred.

Figure 4:
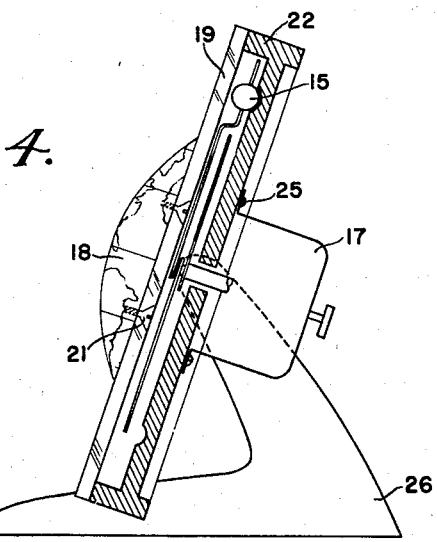
Figure 4 is a sectional view taken substantially through the center of the clock shown in Figure 3.

So that the crystal 19 will be disposed with respect to the clock face 11 so as not to interfere with the travel of "satellite" 15 about the clock face, the crystal is mounted on dial member 10 above the clock face in the manner shown in Figure 4. In this instance, a raised edge 22 is provided, extending about all sides of the clock face so as to provide an adequate support for all edges of crystal 19. Corner brackets 23 are provided to anchor the corners of the crystal with respect to raised edges 22 and the brackets may be removably secured in position by small screws 29. Therefore, if it is ever necessary to remove the transparent face cover or crystal 19, it is only necessary to remove two or more of the corner brackets 23.

Although a clock according to this invention may be equipped with a spring motor, it is preferable that an electric motor such as motor 17 be provided. Because member 15 rotates as it travels about the clock face of the illustrated embodiment, the additional power demand upon the motor is quite small and a conventional electric clock motor may be used, secured in position by screws 25.

As can be noted from the drawings, legs 26 are provided which are disposed on either side of the clock and about which the clock may be made rotatable so as to permit it to be viewed from a variety of directions. As should be apparent, however, a clock constructed in accordance with this invention may be a wall clock, for which no legs would be necessary. The dial member 10 may be made from a single piece of wood, plastic or metal. Preferably, however, this member is made of anodized aluminum, the center portion of which has been removed such as by the use of a milling cutter, with upstanding edges 22 being left about the periphery of the face to form the support for the crystal 19. The groove 16 can likewise be milled from the face. The rear side of dial member 10 can be recessed in a manner similar to its face, so as to create a recess in which the clock motor can be secured.

As should be evident, a number of variations are possible in the construction of a clock according to this invention. A particularly striking appearance can be achieved by the use of a solid black face 11 upon which stars 28 may be employed to designate the hours, and additional small stars 31 used outside the groove 16 to create additional appearance. The earth 18 preferably appears in full color, such as the continents finished in green and the water about the continents blue. The legs 26 can be finished so as to have a gilded appearance, to complete the decorative scheme.

As previously mentioned a number of alternate arrangements are possible, and, for instance, an alternate arrangement can be created for representing the travel of the orbital body about the earth. Instead of groove 16 being employed, a portion of the face 11 can be magnetized, and the member 15 made of ferric metal. In this event, member 15 can be spherical or flat as may be desired, with the magnetic portion of the dial causing the satellite member to travel back and forth on the hand so as to describe the desired orbit.

As a further example, the clock according to this invention could be a relatively permanent fixture on a wall, such as an integral part of the wall of the administration building of an airport. Also, the satellite could be arranged to spin upon its axis of rotation at a greater rate than it would spin by rolling in a groove located upon the face of the clock. Furthermore, the device according to this invention could be a barometer, altimeter, or any other analogous indicating device.

Various changes may be made in the details of construction and the arrangement of the members without departing from the spirit of this invention, or sacrificing any of its structural or aesthetic features.

I claim:

1. A clock having a face and a seconds hand movable about said face; a member slidably and rotatably mounted upon said seconds hand near the end thereof; said member being in substantially continuous contact with said face, and caused to roll across said face in a generally circumferential manner as said seconds hand moves thereabout, and means to cause said member to move back and forth upon a portion of said seconds hand so as to describe an elliptical path about said clock face as said hand moves to indicate the passage of time.

2. A clock having a face and at least one hand movable about said face; a substantially spherical member slidably mounted upon said hand near the end thereof; and a groove disposed generally in the shape of an ellipse about said face in which groove said member is caused to roll, thereby to describe an elliptical path about said clock face as said hand moves to indicate the passage of time.

3. An indicating device having a face representative of a world, a hand movable about said face, and a member mounted upon said hand for movement about said face so as to represent a body orbiting about said world, said member being in rolling contact with said face.

References Cited in the file of this patent

UNITED STATES PATENTS

| | | |
|---|---|---|
| 384,285 | Rugg | June 12, 1888 |
| 471,524 | Riter et al. | Mar. 22, 1892 |
| 477,846 | Rassweiler | June 28, 1892 |
| 754,845 | Burke | Mar. 15, 1904 |
| 1,093,024 | App | Apr. 14, 1914 |
| 1,848,974 | Phillips | Mar. 8, 1932 |
| 2,056,089 | Boggs | Sept. 29, 1936 |

FOREIGN PATENTS

| | | |
|---|---|---|
| 18,384 | Great Britain | Aug. 10, 1912 |
| 39,365 | Denmark | Oct. 4, 1928 |
| 929,179 | France | June 30, 1947 |